United States Patent
Tsia et al.

(10) Patent No.: US 11,032,494 B2
(45) Date of Patent: Jun. 8, 2021

(54) RECOVERY OF PIXEL RESOLUTION IN SCANNING IMAGING

(71) Applicant: VERSITECH LIMITED, Hong Kong (CN)

(72) Inventors: Kin Man Kevin Tsia, Hong Kong (CN); Chi Shing Antony Chan, Hong Kong (CN)

(73) Assignee: Versitech Limited, Hong Kong (CN)

( * ) Notice: Subject to any disclaimer, the term of this patent is extended or adjusted under 35 U.S.C. 154(b) by 233 days.

(21) Appl. No.: 16/322,009

(22) PCT Filed: Sep. 28, 2017

(86) PCT No.: PCT/CN2017/103863
§ 371 (c)(1),
(2) Date: Jan. 30, 2019

(87) PCT Pub. No.: WO2018/059469
PCT Pub. Date: Apr. 5, 2018

(65) Prior Publication Data
US 2019/0174078 A1    Jun. 6, 2019

Related U.S. Application Data

(60) Provisional application No. 62/400,926, filed on Sep. 28, 2016.

(51) Int. Cl.
*H04N 5/349* (2011.01)
*G06T 3/40* (2006.01)
*G01N 15/14* (2006.01)

(52) U.S. Cl.
CPC ............ *H04N 5/349* (2013.01); *G01N 15/147* (2013.01); *G01N 15/1484* (2013.01); *G06T 3/4053* (2013.01); *G06T 3/4069* (2013.01)

(58) Field of Classification Search
CPC ...... H04N 5/349; G06T 3/4069; G06T 3/4053; G06T 2207/10056; G06T 2207/20221; G06T 2207/30004; G01N 15/147; G01N 15/1484; G02B 21/367; G02B 21/0008; G02B 21/002; G02B 21/365;
(Continued)

(56) References Cited

U.S. PATENT DOCUMENTS

| 5,600,379 A | 2/1997 | Wagner |
| 8,179,445 B2 | 5/2012 | Hao |

(Continued)

FOREIGN PATENT DOCUMENTS

| CN | 104111242 A | 10/2014 |
| CN | 105551023 A | 5/2016 |
| EP | 0 734 632 B1 | 1/2001 |

OTHER PUBLICATIONS

International Search Report and Written Opinion dated Jan. 3, 2018 in International Application No. PCT/CN2017/103863.
(Continued)

*Primary Examiner* — Michael S Osinski
(74) *Attorney, Agent, or Firm* — Saliwanchik, Lloyd & Eisenschenk

(57) ABSTRACT

This invention describes a technique to enhance pixel resolution of high-speed laser scanning imaging by the means of sub-pixel sampling, applicable to one-dimensional (1D), two-dimensional (2D), and three-dimensional (3D) imaging.

14 Claims, 4 Drawing Sheets

(58) Field of Classification Search
CPC .. G03H 1/0443; G03H 1/0866; G03H 1/0005; G03H 1/0465
See application file for complete search history.

(56) References Cited

U.S. PATENT DOCUMENTS

| | | | | |
|---|---|---|---|---|
| 8,233,745 | B2* | 7/2012 | Matsumoto | G06T 3/4007 382/299 |
| 8,326,069 | B2* | 12/2012 | Maslov | G06T 3/4053 382/254 |
| 9,183,616 | B2 | 11/2015 | Pavani | |
| 9,426,429 | B2* | 8/2016 | Zheng | H04N 7/183 |
| 9,892,812 | B2* | 2/2018 | Zheng | G02B 21/365 |
| 2010/0002000 | A1 | 1/2010 | Everitt et al. | |
| 2011/0234757 | A1 | 9/2011 | Zheng et al. | |
| 2012/0098950 | A1 | 4/2012 | Zheng et al. | |
| 2012/0176489 | A1* | 7/2012 | Oshiro | G02B 27/0075 348/80 |
| 2012/0248292 | A1* | 10/2012 | Ozcan | G03H 1/0443 250/208.1 |
| 2012/0281883 | A1* | 11/2012 | Hurley | G01N 21/6458 382/109 |
| 2013/0070091 | A1* | 3/2013 | Mojaver | H04N 7/183 348/143 |
| 2013/0070103 | A1* | 3/2013 | Mojaver | H04N 5/2258 348/169 |
| 2014/0085449 | A1* | 3/2014 | Mandelis | H04N 7/183 348/77 |
| 2014/0160236 | A1* | 6/2014 | Ozcan | G03H 1/0866 348/40 |
| 2014/0300696 | A1* | 10/2014 | Ozcan | G03H 1/0005 348/40 |
| 2015/0036038 | A1* | 2/2015 | Horstmeyer | G02B 21/0048 348/342 |
| 2016/0117823 | A1* | 4/2016 | Isaacs | A61B 6/486 715/863 |
| 2017/0085790 | A1* | 3/2017 | Bohn | H04N 5/247 |
| 2017/0211925 | A1* | 7/2017 | Kobayashi | A61B 3/15 |
| 2017/0278259 | A1* | 9/2017 | Hattori | G02B 21/365 |
| 2017/0366714 | A1* | 12/2017 | Ding | H04N 5/2256 |
| 2017/0371142 | A1* | 12/2017 | Anthony | H04N 1/00 |
| 2019/0137743 | A1* | 5/2019 | Schumann | G02B 21/368 |
| 2019/0137932 | A1* | 5/2019 | Ozcan | G03H 1/0443 |
| 2020/0310100 | A1* | 10/2020 | Ozcan | G03H 1/0866 |

OTHER PUBLICATIONS

Bosworth, B. T. et al., "High-speed flow microscopy using compressed sensing with ultrafast laser pulses," *Optics Express*, Apr. 20, 2015, vol. 23, No. 8, 12 pages, Optical Society of America.

Xu, C. et al., "Photonic-assisted time-interleaved ADC based on optical delay line," *Journal of Optics*, Dec. 11, 2015, 18:1-6, 2016 IOP Publishing Ltd.

Moshe, B. et al., "Video Super-Resolution Using Controlled Subpixel Detector Shifts," *IEEE Transactions on Pattern Analysis and Machine Intelligence*, Jun. 2005, 27(6):977-987, IEEE Computer Society.

Park, S. C. et al., "Super-Resolution Image Reconstruction: A Technical Overview," *IEEE Signal Processing Magazine*, May 2003, pp. 21-36, IEEE.

* cited by examiner

RECOVERY OF PIXEL RESOLUTION IN SCANNING IMAGING

CROSS-REFERENCE TO RELATED APPLICATIONS

This application is the U.S. national stage application of International Patent Application No. PCT/CN2017/103863, filed Sep. 28, 2017, which claims the benefit of U.S. Provisional Application Ser. No. 62/400,926, filed Sep. 28, 2016, the disclosure of each of which is incorporated herein by reference in its entirety.

FIELD OF THE INVENTION

The field of invention relates to the method of data acquisition in imaging systems.

BACKGROUND OF THE INVENTION

Motivated by the predicament brought by the high-sampling-rate operation, our invention is a pixel super-resolution (pixel-SR) technique that enhances the pixel resolution (i.e. anti-aliasing) of high-speed laser scanning imaging (e.g. time-stretch imaging or free-space angular-chirp-enhanced delay (FACED) imaging) at the lower sampling rate, which is easily supported by any commercial-grade digitizers. It is based upon the general concept of pixel-SR in which high-resolution (HR) image information can be restored from multiple subpixel-shifted, low-resolution (LR) images captured by a lower sampling rate. Different from prior art in pixel-SR techniques, our invention harnesses the fact that subpixel shift of consecutive line scans (during imaging) is naturally generated by the mismatch between laser-scan repetition frequency and sampling frequency of the back-end digitizer—a feature appeared in all types of laser-scanning imaging modalities. Therefore, it requires no active synchronized control of illumination or detection for precise sub-pixel shift operation at an ultrafast rate. Unlike any classical pixel-SR imaging techniques, our invention does not require any additional hardware for controlled subpixel-shift motion (e.g. detector translation, illumination beam steering), or complex image pixel registration algorithms for uncontrolled motions, thanks to the highly precise and reconfigurable pixel drifting. Without sacrificing spatial resolution at the high-speed scanning rate, our invention could be beneficial to any laser-scanning imaging applied in ultrafast or/and high-throughput imaging applications, ranging from surface inspection and quality control in industrial manufacturing (e.g. machine vision for web-inspection, semiconductor VLSI chip manufacturing), non-contact metrology, to single-cell analysis in basic life-science (in biomedical and environmental studies) and clinical diagnosis (e.g. cell-based assay and tissue micro-array (TMA), whole slide imaging (WSI)).

Advantages of Embodiments of the Invention and Summary

Enhances or restore the pixel resolution of high-speed laser scanning imaging even at the lower sampling rate—for ultrafast imaging (at a line-scan rate beyond sub-MHz) without compromising spatial resolution.

A versatile pixel-SR technique in that subpixel shift of consecutive line scans (during imaging) is naturally generated by the mismatch between laser-scan repetition frequency and sampling frequency of the digitizer—applicable to 1D, 2D, and 3D laser-scanning imaging strategies.

All-passive pixel-SR technique—does not require any additional hardware for controlled subpixel-shift motion or complex image pixel registration algorithms for uncontrolled motions.

Highly precise and reconfigurable pixel drifting and unique pixel registration algorithm.

DETAILED DESCRIPTION

Figure 1:
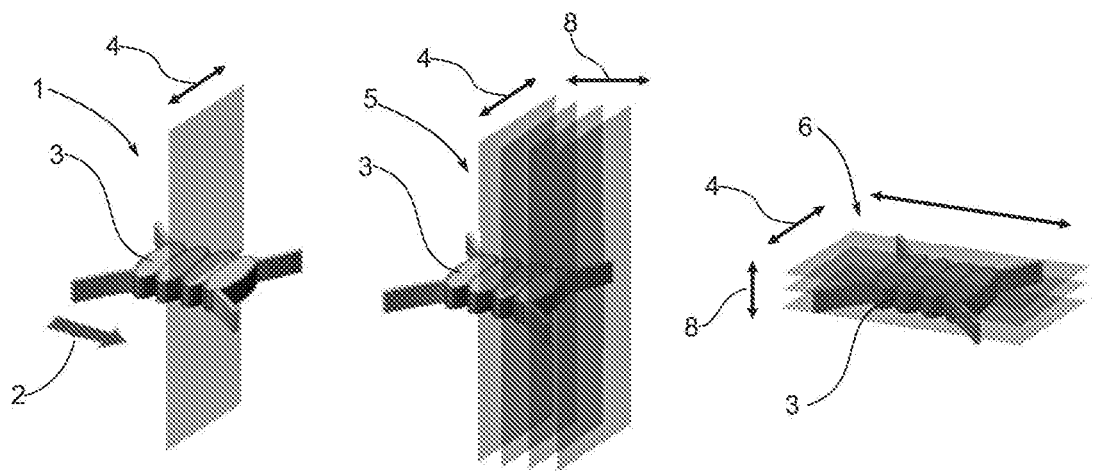
FIG. 1 shows schematics of 1D, 2D and 3D laser-scanning strategies.

Our invention is a pixel-SR technique that enhances the pixel resolution (i.e. anti-aliasing) of high-speed laser scanning imaging (e.g. time-stretch imaging or free-space angular-chirp-enhanced delay (FACED) imaging) at the lower sampling rate, which is easily supported by any commercial-grade digitizers. It can be applicable to 1D [1], 2D [5] and 3D [6] laser-scanning strategies (FIG. 1). In one embodiment, time-interleaved measurements by the sampling clock shift originated from the fact that the digitizer sampling clock is unlocked from the laser-scanning frequency (e.g. pulsed laser source [7], or generally the scanning element). By harnessing this effect at a lower sampling rate, our invention is able to extract multiple LR images, each of which is automatically subpixel-shifted at a high temporal precision (e.g. tens of picoseconds in time-stretch imaging or FACED imaging).

In one embodiment, the 1D line-scanning [1] of the unidirectional motion of the specimen [3], e.g. biological cells in microfluidic flow [2]. The 2D image [11] is reconstructed by digitally stacking the captured line-scans [1], so that the fast axis [4] of the resultant 2D image [11] is the line-scan direction, and the slow axis [2] corresponds to the specimen motion direction. In one embodiment, the 2D line-scanning [5] is performed by scanning the line-scan beam along the slow axis [8] whereas the specimen [3] is at fixed position or in slow motion compared to the line-scanning speed along the slow axis [8]. The 2D image [11] is reconstructed by digitally stacking the captured line-scans [5]. In one embodiment, the 3D line-scanning [6] is performed by scanning the line-scan beam in 2D, i.e. along both the slow [6] and axial axis [8]. The specimen [3] is at fixed position or in slow motion compared to the line-scanning speed along the slow [6] and axial axis [8].

Figure 2:
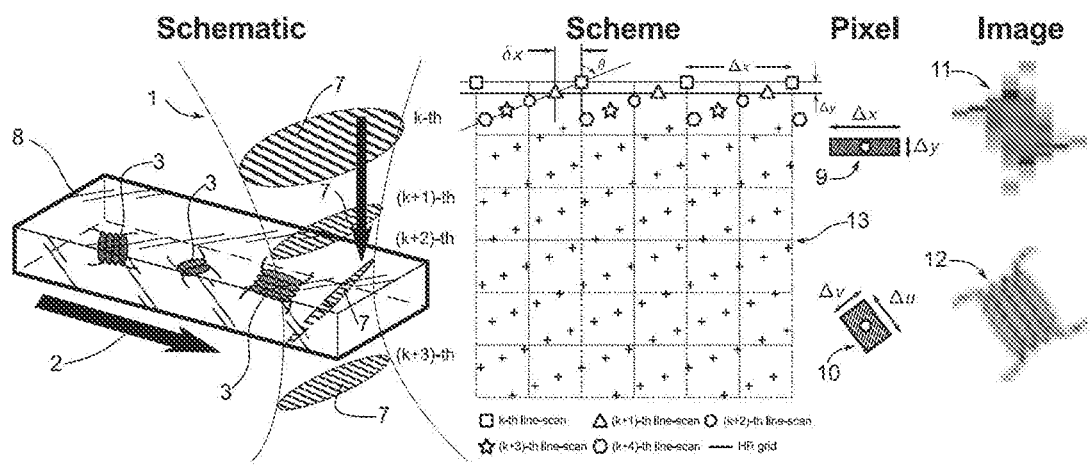
FIG. 2 shows a schematic of an on-the-fly line-scan imaging of the specimen [3] according to an embodiment of this invention.

For the sake of demonstration, we consider the most common form of laser-scanning imaging which is 1D line-scanning [1] imaging. It has been proven in a broad range of applications, from flow cytometry to surface inspection, i.e. on-the-fly line-scan imaging of the specimen [3] (FIG. 2). In one embodiment in 1D line-scanning [1] imaging, the imaged specimen [3] is a biological cell in a microfluidic flow [2]. In this case, the pixel resolution along the fast axis [4] is the product of linear flow speed $v_y$ and the laser pulse repetition rate F i.e. $y=v_y F^{-1}$. On the other hand, the pixel resolution along the slow axis [2] is independently determined by the resolving power of the imaging setup and scanning speed, i.e. $x=Cf^{-1}$, where C is the scanning speed of the system (or essentially a conversion factor of space-to-time); and f is the sampling rate of the digitizer. When operated at low sampling rates, laser-scanning imaging of ultrafast flow [2] generates elongated pixels [9] (FIG. 2). For example, we find that the aspect-ratio of the original LR pixel [9], defined as $$r = \frac{\Delta y}{\Delta x} = \frac{v_y f}{CF}, \quad (1)$$

is as small as in the order of $10^{-2}$ in typical ultrafast laser-scanning imaging configuration operating beyond MHz, e.g. time-stretch imaging or FACED imaging. Ideally, if the sampling clock frequency f of the digitizer is locked to the laser pulse repetition rate F, the line scans will perfectly align along the slow axis. In practice, the average number of pixels per line scan (=f/F) is not an integer. The line-scans [1] appears to "drift" along the slow axis [2], and hence the 2D image [11] appears to be highly warped especially at low sampling rate (FIG. 2). Specifically, as the sampling rate f is unlocked from the laser pulse repetition rate F, pixel drift between adjacent time-stretch line-scans [1] is observed, and can be expressed as $$\delta x = C\left(\frac{1}{F} - \frac{N}{f}\right), \quad (2)$$

where integer N is the number of pixels per line scan rounded off to the nearest integer. It can be shown that $|\delta x| \leq \Delta x/2$. The warp angle is thus given as $\tan \theta = \delta x/\Delta y$, as illustrated in FIG. 2. A common and straightforward approach to dewarp the image is to realign the 2D image [11] (FIG. 2). However, this would, as shown later, result in image aliasing and artefact that are particularly severe at the lower sampling rates (FIG. 2). Furthermore, digital up-sampling adds no additional image information and thus provides no improvement in resolution along the fast axis.

Figure 3:
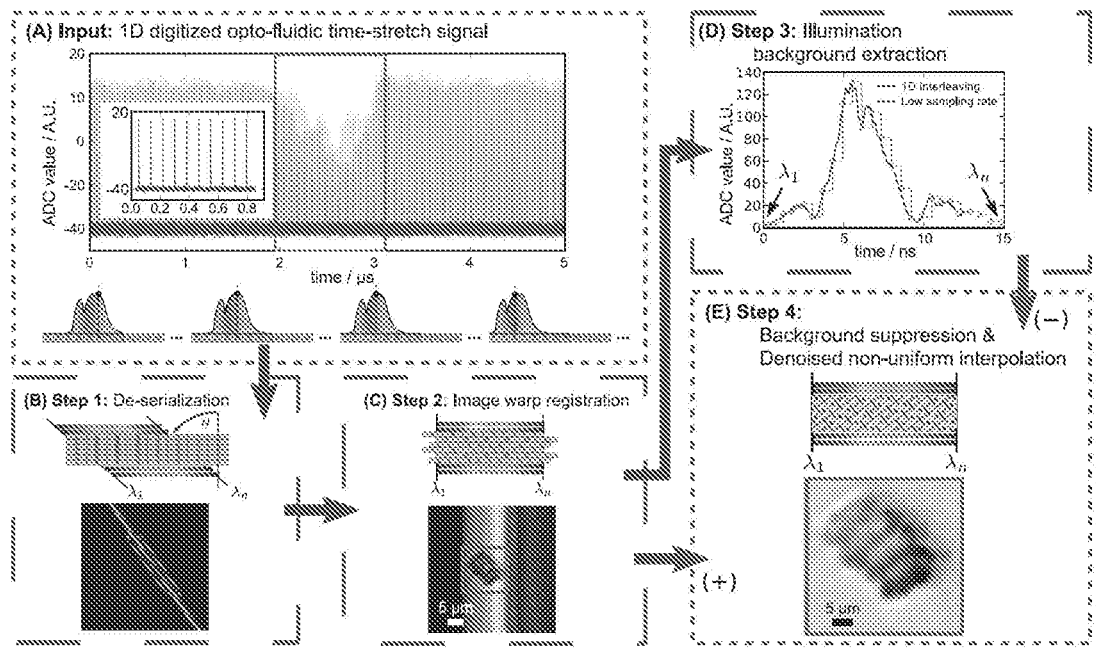
FIG. 3 depicts the graphical representation of image warp registration according to an embodiment of this invention.

Our invention harnesses the warping effect for creating the relative "subpixel shift" on both the fast axes [4] and slow axes [2], and thus restoring a high-resolution 2D image [12] (FIG. 2). Unique to our invention is the image warp registration method. We first register the exact warp angle θ of the grid [13] (FIG. 2). It can be done by using the intentional non-uniform illumination background of the line-scan [1] (e.g. the laser spectrum in time-stretch imaging, or varying/modulating the illumination intensity during scanning) as the reference. The precision of the measured warp angle critically influences the performance of the pixel-SR algorithm (FIG. 3). Specifically, this warping needs to be compensated for accurate extraction of the non-uniform illumination profile introduced in the system, evaluated as $$I_B(x)|_\theta \approx \frac{1}{M\Delta y} \int_0^{M\Delta y} W_\theta^{-1}[I(x,y)]dy, \quad (3)$$

where M is the number of line scans of the warped image, function $W_\theta^{-1}[\cdot]$ is the image dewarp filter at angle θ. Note that in the case of 3D laser-scanning, the warp angle θ along the axial-slow-axis plane (i.e. [4] and [8] in FIG. 1) should also be evaluated. Ideally, a "clean" foreground can be obtained by direct subtraction of the Background from the dewarped image [11]. Error in the value of the warp angle θ induces distortions in the estimated Background, thus results in band-like artefacts superimposed onto the foreground specimen [3]. However, this property can be exploited to obtain an accurate value $\hat{\theta}$ by maximizing the "cleanliness" of the extracted foreground, i.e. by minimizing the energy of the foreground, expressed as $$\hat{\theta} = \underset{\theta}{\arg\min} \int_0^{N\Delta x} \int_0^{M\Delta y} [W_\theta^{-1}[I(x,y)] - I_B'(x)|_\theta]^2 dy dx, \quad (4)$$

where the integer N is the number of pixels of each line scan. FIG. 3 depicts the graphical representation of image warp registration. After this step, the non-uniform illumination background can be readily suppressed by subtracting the intermediate "dewarped" image with the high-bandwidth 1D reference illumination signal Background, which is in turn restored by interleaving the first q LR line-scans [1] (FIG. 3). The 1D interleaving operation is based on a fast shift-and-add algorithm together with rational number approximation. Finally, the image is denoised and re-sampled into the regular high-resolution grid [13], thus reveals high-resolution information. Complete steps of pixel-SR laser-scanning imaging is depicted in FIG. 3, which describes the methods used in time-stretch imaging. The same workflow can be applied to any other laser scanning imaging modalities.

Note that interpolation of neighbouring line-scans [1] effectively enlarges the pixel size along the slow axis and reduces the effective imaging line-scan rate. As shown in FIG. 2, the dimensions of the interpolated pixel along the warped direction is given as $$\Delta u = \Delta x \cos \theta$$

$$\Delta v = \Delta y (\cos \theta)^{-1}. \quad (5)$$

When we consider the ratio of pixel size reduction, given as $$2r < \frac{\Delta u}{\Delta x} \leq \frac{1}{\sqrt{2}} \quad (6)$$

$$\sqrt{2} \times r \leq \frac{\Delta v}{\Delta x} < \frac{1}{2},$$

the resolution improvement in the demonstration is particularly significant for highly elongated pixels [Eq. (1) and FIG. 2], and a significant warping ($|\tan \theta| \gg 1$). Both cases are achievable at high repetition rate of ultrafast laser-scanning rate (i.e. $F \gg 0.1$ MHz). Also, the enlarged pixel size along the slow axis after interleaving is still well beyond the optical diffraction limit—leveraging the ultrafast scan rate.

Figure 4:
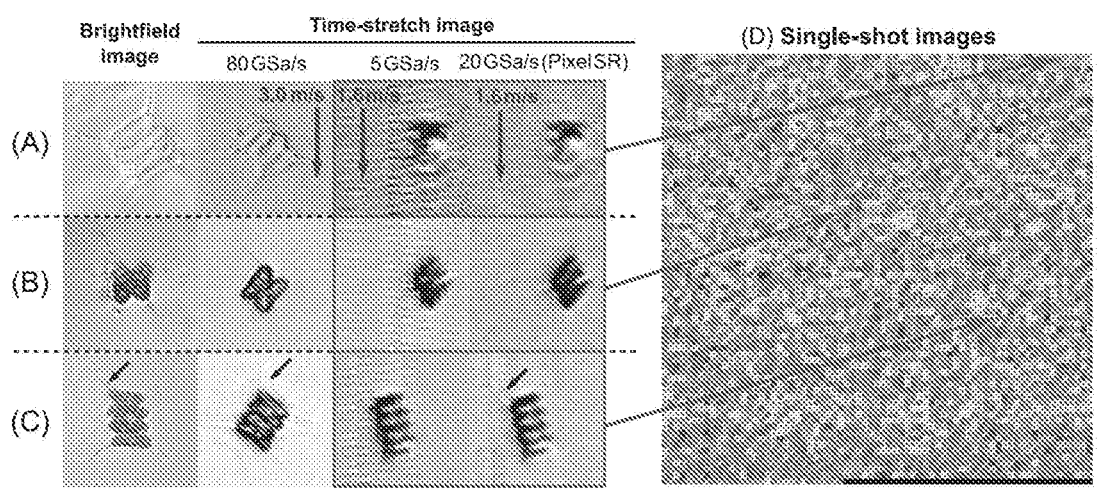
FIG. 4 shows a schematic diagram of time-stretch images and their recovery at different sampling rates of the oscilloscope according to an embodiment of this invention.

As mentioned earlier that our invention is applicable to any laser-scanning imaging, we here for the sake of proof-of-principle, demonstrate pixel-SR for ultrafast laser-scanning time-stretch imaging with improved spatial resolution. We choose a class of phytoplankton, scenedesmus [3] (Carolina Biological, USA), for its distinct morphological property. In the experiment, individual scenedesmus [3] were loaded into the channel [8] at an ultrafast linear flow velocity of 1 $ms^{-1}$ to 3 $ms^{-1}$. The time-stretch waveforms were then digitized by a real-time oscilloscope with adjustable sampling rate between 5 GSa/s and 80 GSa/s. At the highest possible sampling rate (80 GSa/s), the cellular images comes with sharp outline and visible intracellular content (second column, FIG. 4). At a lower sample rate of 5 GSa/s, however, the pixel dimensions become respectively $(\Delta x, \Delta y)$ =(3.6 μm, 0.18 μm). As the diffraction limited resolution is estimated to be approximately 2 μm, the cell images captured at such a low sampling rate become highly aliased (third column, FIG. 4). Our invention in contrast could in principle achieve 10 times resolution improvement. In our current setup, the actual resolution improvement is roughly limited to 4 times, i.e. at pixel size of and at effective sampling rate of 20 GSa/s (fourth column in FIG. 4). This is not inherent to the pixel-SR algorithm. Instead, the restored image resolution is currently limited by the built-in signal conditioning filter 10 GHz at cut-off frequency in the oscilloscope, implying that the additional subpixel measurements does not equally provide 10 times improvement in spatial resolution.

Figure 5:
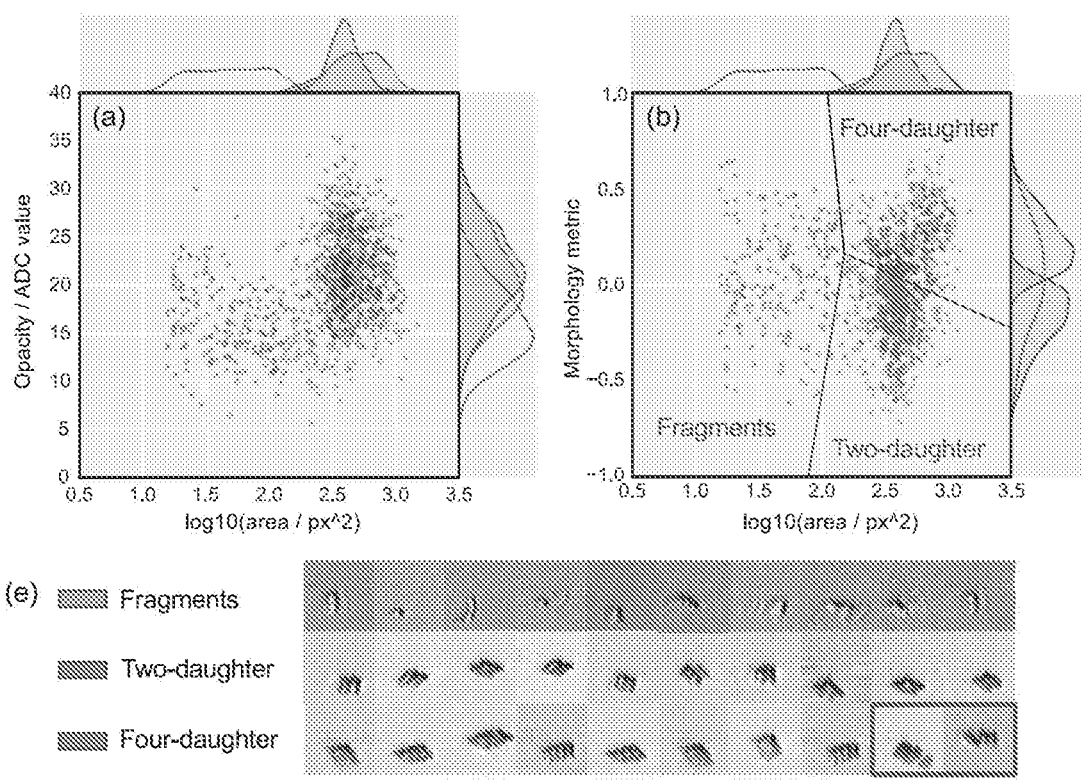
FIG. 5 demonstrates an embodiment of pixel-SR imaging in high-throughput imaging based automated classification.

Taking advantage of HR image restoration, ultrafast pixel-SR laser-scanning imaging such as time-stretch imaging is particularly useful to enable label-free, high-throughput cellular classification and analysis based on the morphological features, which is not possible with standard flow cytometry. Here, we performed classification of sub-types of scenedesmus [3] (n=5,000) imaged by our optofluidic pixel-SR time-stretch imaging system (sampled at 5 GSa/s). The images of individual colonies are reconstructed by pixel-SR algorithm in the high-performance cluster. We first retrieved two label-free metrics of single cells: opacity and area from the restored pixel-SR frames. These spatially-averaged metrics represent the optical density (attenuation) and the size of the scenedesmus colonies [3] respectively. The cell images were automatically classified into three groups by K-means clustering. Based on the scatter plot of these two parameters (FIG. 4), fragments are easily distinguishable from the live cells because they are significantly smaller and more translucent (see also the images in FIG. 4). However, these spatially-averaged metrics (or essentially LR metrics) failed to account for the subtle morphological differences between the two-daughter and four-daughter colonies, both of which exhibit high variability in both the area and the opacity. Next, the new morphology metric was extracted adaptively from the collections of pixel-SR images, and plotted against cell area in the scatter plot (FIG. 5). We encoded the morphological features of each image into the histogram of oriented gradients (HoG), which was then projected to the most significant component using principle component analysis (PCA). Essentially, this metric provides a measure of structural complexity of the cell bodies of the scenedesmus colonies [3]. Replacing the opacity metric, with this new morphological metric, we care able to separate the clusters of the two-daughter colonies from the four-daughter colonies (FIG. 5)—demonstrating the importance of pixel-SR strategy in high-throughput imaging based automated classification.

Figure 6:
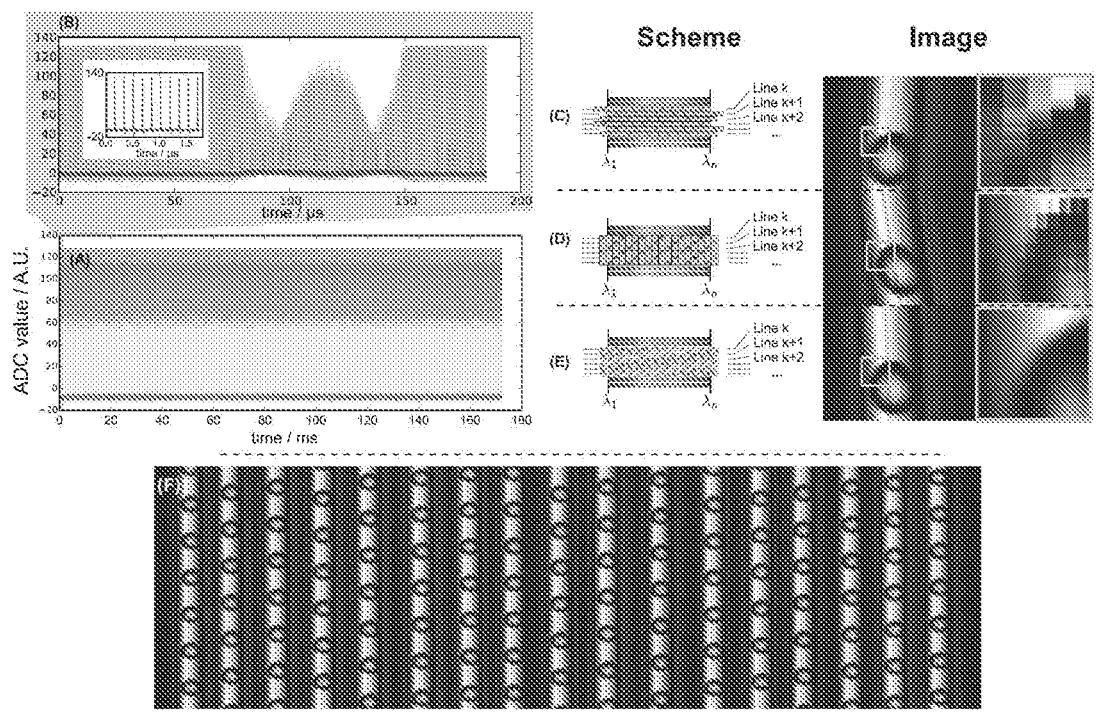
FIG. 6 shows a schematic diagram of improvement at pixel resolution that the pixel-SR algorithm recovers HR time-stretch images according to an embodiment of this invention.
Figure 7:
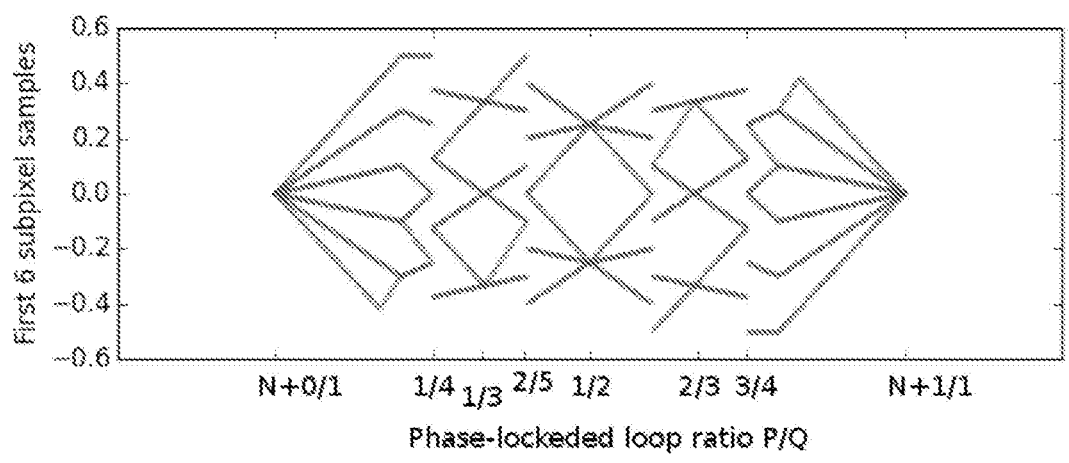
FIG. 7 shows a schematic diagram of first 6 subpixel samples at different phase-locked loop ratios P/Q according to an embodiment of this invention.

As mentioned earlier that a practical advantage of pixel-SR for high-speed laser-scanning is that it relaxes the stringent requirement on the extremely high sampling rate (40 GSa/s or beyond), which can only be offered by the state-of-the-art and costly oscilloscopes. Ultrafast data acquisition with such high-end oscilloscopes conventionally comes with limited memory buffers. Not only does it hinder continuous, real-time on-the-fly data storage, but also high-throughput post-processing and analytics. Our invention offers an effective approach to address this limitation by capturing the ultrafast laser-scanning images at a lower sampling rate, yet without compromising the image resolution. More significantly, unlike the use of high-end oscilloscope in the previous experiments, the lower-sampling-rate digitizer can readily be equipped with an FPGA, capable of continuous and reconfigurable streaming of enormous time-stretch image raw data to the distributed computer storage cluster. To demonstrate the applicability of pixel-SR to such a high-throughput data processing platform, we performed continuous real-time monitoring of water-in-oil emulsion microdroplet generation (at a velocity as high as 0.3 $ms^{-1}$) in the microfluidic channel device [8]. The time-stretch image signal is continuously recorded at the sampling rate of 3.2 GSa/s (FIG. 6).

Similar to the previous experiments using the oscilloscope, we also observed that the raw time-stretch image is highly warped because of the unlocked clocking between the laser and the digitizer (FIG. 6B-C). It is reminded that the frequently adopted approach is to dewarp the image by aligning the individual line scans. As shown in FIG. 6C, each line-scan [1] is digitally up-sampled by at least eight times for re-alignment. While this strategy used to work for oversampled time-stretch signal at bandwidth, it does not perform well at the low sampling rate because of signal aliasing (FIG. 6C). An alternative approach is to interleave multiple line scans to resolve the high bandwidth 1D temporal waveform (FIG. 6D-E). It is commonly known as equivalent time sampling. However, fusion of multiple line-scans comes with the reduction of pixel resolution along the slow axis, which also introduces image aliasing (FIG. 6D). In contrast, our pixel SR algorithm is able to restore HR time-stretch image at any arbitrary time points. The resolution improvement is five times the apparent pixel size, i.e. at effective sampling rate of and at pixel resolution of (FIG. 6E-F).

As mentioned before, asynchronous sampling of the ultrafast image signal gives rises to relative subpixel alignment of the 1D line-scans [1], which can be precisely determined by our pixel registration algorithm. Our invention can also be applied to synchronous digitizer locked to the ultrafast line-scan rate, so that the subpixel alignment can be precisely predetermined in a reconfigurable manner. This can be realized by locking the digitizer sampling is clock to the laser pulse trigger with a phase-lock loop (PLL) at a fractional ratio P/Q. For example, if the digitizer clock is locked to the pulsed laser at ratio P/Q=502/5=1002/5, the apparent number of pixels per line-scan is N=100. However, the relative subpixel alignment of the k-th line-scans can be precisely determined at $d_k = \delta x \times k = (2k \mod 5)/5 = \{+0.0, +0.4, -0.2, +0.2, +0.0, +0.4, \ldots\}$ to provide five times of apparent number of pixels for each line-scan (i.e. N=500). The accumulated subpixel positions for different P/Q values are shown in PhaseLock. This ratio can be precisely adjusted in hardware (e.g. by the PLL) to control the density of the subpixel locations. It is noted that when synchronous phase-locking is implemented, energy minimization of foreground (Eq. 4) can be bypassed.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A method of enhancing pixel resolution of high speed laser scanning imaging to enhance pixel resolution of high-speed laser scanning imaging by the means of sub-pixel sampling, applicable to one-dimensional (1D), two-dimensional (2D), and three-dimensional (3D) imaging;
wherein the high speed laser scanning imaging includes on-the-fly line scan imaging of a specimen,
wherein on-the-fly line scan refers to the relative motion between the specimen and the laser line-scan beam,
wherein the on-the-fly line scan imaging of the specimen comprises applying 1D line-scanning to the specimen with unidirectional motion to obtain captured 1D line scans, and reconstructing a 2D image by digitally stacking the captured 1D line scans,
wherein a fast axis of the 2D image corresponds to a line-scan direction, and a slow axis corresponds to a specimen motion direction,
wherein the method further comprises harnessing a warping effect of the 2D image or a resultant 3D image to create a relative subpixel shift on the fast axis, the slow axis, and an axial axis so as to restore a high-resolution 2D or 3D image, and wherein the warping effect is caused by pixel drift between adjacent line-scans as a sampling rate f of a digitizer is unlocked from a laser pulse repetition rate F of the high-speed laser scanning imaging.

2. The method of claim 1, wherein enhancing pixel resolution of high-speed laser scanning imaging by the means of sub-pixel sampling comprises restoring high-resolution (HR) image information from multiple subpixel-shifted, low-resolution (LR) images captured by a lower sampling rate of a digitizer by means of subpixel shift of consecutive line scans during imaging naturally generated by the mismatch between laser-scan repetition frequency of the high speed laser scanning imaging and sampling rate of the digitizer.

3. The method of claim 1, wherein the high speed laser scanning imaging includes on-the-fly line scan imaging of a specimen,
wherein on-the-fly line scan refers to the relative motion between the specimen and the laser line-scan beam, and
wherein the on-the fly line scan imaging of the specimen further comprises applying 2D line-scanning to the specimen by scanning the line-scan beam along a slow axis to obtain captured 2D line scans, and reconstructing a 2D image by digitally stacking the captured 2D line scans, and wherein a fast axis of the resultant 2D image corresponds to a line-scan direction, and the slow axis corresponds to a line-scan beam motion direction.

4. The method of claim 1, wherein the high speed laser scanning imaging includes on-the-fly line scan imaging of a specimen,
wherein on-the-fly line scan refers to the relative motion between the specimen and the laser line-scan beam, and
wherein the on-the fly line scan imaging of the specimen comprises applying 3D line-scanning to the specimen by scanning the line-scan beam along a slow axis and an axial axis to obtain captured 3D line scans, and reconstructing a 3D image by digitally stacking the captured 3D line scans along the slow and axial axes, and wherein a fast axis of the resultant 3D image corresponds to a line-scan direction, and the slow and axial axes corresponds to line-scan beam motion directions.

5. A method of enhancing pixel resolution of high speed laser scanning imaging to enhance pixel resolution of high-speed laser scanning imaging by the means of sub-pixel sampling, applicable to one-dimensional (1D), two-dimensional 2D), and three-dimensional (3D) imaging,
wherein the high speed laser scanning imaging includes on-the-fly line scan imaging of a specimen,
wherein on-the-fly line scan refers to the relative motion between the specimen and the laser line-scan beam,
wherein the on-the-fly line scan imaging of the specimen further comprises applying 2D line-scanning to the specimen by scanning the line-scan beam along a slow axis to obtain captured 2D line scans, and reconstructing a 2D image by digitally stacking the captured 2D line scans, and wherein a fast axis of the 2D image corresponds to a line-scan direction, and the slow axis corresponds to a line-scan beam motion direction,
wherein the method further comprises harnessing a warping effect of the 2D image or a resultant 3D image to create a relative subpixel shift on both the fast axis and slow axis,
wherein harnessing the warping effect of the 2D image or the resultant 3D image to creating the relative subpixel shift on both the fast axis and slow axis is implemented by the following steps:
introducing a predetermined non-uniform illumination background of 1D line-scan as the reference for compensating the warping of the 2D image or the resultant 3D image;
registering a warp angle θ in a high-resolution grid of the multiple captured line-scan images, comprising:
dewarping the image with a dewarp filter at a given warp angle θ; and
obtaining an accurate value $\hat{\theta}$ by improving an appearance of the extracted foreground by minimizing the energy or band-like artifacts of a foreground;
subtracting the dewarped image with 1D reference illumination background;
restoring the 2D image or the resultant 3D image by interleaving the LR line-scan images; and
denoising and re-sampling the restored 2D image or resultant 3D image into the high-resolution grid, and revealing the high-resolution information.

6. The method of claim 5, wherein the predetermined non-uniform illumination background of the 1D line-scan comprises a laser spectrum in time-stretch imaging or varying/modulating the illumination intensity during scanning.

7. The method of claim 6, wherein obtaining an accurate value B by minimizing the energy of the foreground is expressed as:

$$\hat{\theta} = \underset{\theta}{\mathrm{argmin}} \int_0^{N\Delta x} \int_0^{M\Delta y} [W_\theta^{-1}[I(x, y)] - I'_B(x)|_\theta]^2 dy dx,$$

wherein, the integer N is the number of pixels of each line scan; function $W_\theta^{-1}[\cdot]$ is the image dewarp filter at angle $\theta$, and $I_B'(x)|_\theta$ is the estimated non-uniform illumination profile introduced in the system.

8. The method of claim 2, wherein the lower sampling rate of the digitizer is as low as mega-samples per second and the laser-scan repetition frequency of the high speed laser scanning imaging $F \gg 0.1$ MHz.

9. The method of claim 1, wherein enhancing pixel resolution of high-speed laser scanning imaging by the means of sub-pixel sampling comprises locking the digitizer sampling clock to the laser pulse trigger with a phase-lock loop (PLL) at a fractional ratio.

10. A system for enhancing pixel resolution of high speed laser scanning imaging to enhance pixel resolution of high-speed laser scanning imaging by the means of sub-pixel sampling, applicable to one-dimensional (1D), two-dimensional (2D), and three-dimensional (3D) imaging, the system comprises:
- a high speed laser scanning imager;
- a digitizer for capturing low-resolution (LR) images at lower sampling rate; and
- a processor and a memory, wherein the memory stores a computer program, the program being executed by the processor to implement the method of claim 1.

11. The method of claim 5, wherein enhancing pixel resolution of high-speed laser scanning imaging by the means of sub-pixel sampling comprises restoring high-resolution (HR) image information from multiple subpixel-shifted, low-resolution (LR) images captured by a lower sampling rate of a digitizer by means of subpixel shift of consecutive line scans during imaging naturally generated by the mismatch between laser-scan repetition frequency of the high speed laser scanning imaging and sampling rate of the digitizer.

12. The method of claim 11, wherein the lower sampling rate of the digitizer is as low as mega-samples per second and the laser-scan repetition frequency of the high speed laser scanning imaging $F \gg 0.1$ MHz.

13. The method of claim 5, wherein enhancing pixel resolution of high-speed laser scanning imaging by the means of sub-pixel sampling comprises locking the digitizer sampling clock to the laser pulse trigger with a phase-lock loop (PLL) at a fractional ratio.

14. A system for enhancing pixel resolution of high speed laser scanning imaging to enhance pixel resolution of high-speed laser scanning imaging by the means of sub-pixel sampling, applicable to one-dimensional (1D), two-dimensional (2D), and three-dimensional (3D) imaging, the system comprises:
- a high speed laser scanning imager;
- a digitizer for capturing low-resolution (LR) images at lower sampling rate; and
- a processor and a memory, wherein the memory stores a computer program, the program being executed by the processor to implement the method of claim 5.

* * * * *